United States Patent
Tervo (10) Patent No.: US 10,241,346 B2
(45) Date of Patent: Mar. 26, 2019

(54) DEGREES OF FREEDOM FOR DIFFRACTION ELEMENTS IN WAVE EXPANDER

(71) Applicant: Microsoft Technology Licensing, LLC, Redmond, WA (US)

(72) Inventor: Jani Kari Tapio Tervo, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 15/149,115

(22) Filed: May 7, 2016

(65) Prior Publication Data
US 2017/0322426 A1 Nov. 9, 2017

(51) Int. Cl.
*G02B 27/42* (2006.01)
*G02B 27/01* (2006.01)
(Continued)

(52) U.S. Cl.
CPC .......... *G02B 27/4211* (2013.01); *G02B 6/124* (2013.01); *G02B 27/0081* (2013.01);
(Continued)

(58) Field of Classification Search
CPC ............ G02B 27/4211; G02B 27/0172; G02B 27/4272; G02B 6/124; G02B 2027/0116;
(Continued)

(56) References Cited

U.S. PATENT DOCUMENTS

| 6,553,162 | B1 | 4/2003 | Okayama |
| 7,062,131 | B2 | 6/2006 | Ilchenko |

(Continued)

FOREIGN PATENT DOCUMENTS

| EP | 2381290 A1 | 10/2011 |
| WO | 2006064334 A1 | 6/2006 |
| WO | 2016020643 A1 | 2/2016 |

OTHER PUBLICATIONS

Han, et al., "Portable waveguide display system with a large field of view by integrating freeform elements and volume holograms", In Journal of Optics Express, vol. 23, Issue 3, Feb. 4, 2015, 16 pages.

(Continued)

*Primary Examiner* — Evan Dzierzynski
*Assistant Examiner* — Mitchell T Oestreich
(74) *Attorney, Agent, or Firm* — Arent Fox LLP (57) ABSTRACT

Disclosed are an apparatus and method for providing additional degrees of freedom for diffraction gratings of an output waveguide in a near-eye display device. The near-eye display device includes an imager to generate an image based on light from a light source. The device further includes a waveguide to input a light wave representing the image received from the imager and to output the light wave representing the image toward an optical receptor of a user. The waveguide includes a plurality of diffractive optical elements (DOEs) in a common light path from an input of the waveguide to an output of the waveguide. The DOEs include a plurality of periodic diffraction patterns. Each of the periodic diffraction patterns is represented by a diffraction pattern vector. The periodic diffraction patterns are determined such that a vector summation of the diffraction pattern vectors equals zero.

14 Claims, 8 Drawing Sheets

(51) Int. Cl.
  *G02B 27/00* (2006.01)
  *G02B 6/124* (2006.01)
(52) U.S. Cl.
  CPC ..... *G02B 27/0172* (2013.01); *G02B 27/4272* (2013.01); *G02B 2027/0116* (2013.01); *G02B 2027/0123* (2013.01); *G02B 2027/0174* (2013.01)
(58) Field of Classification Search
  CPC ........ G02B 27/0081; G02B 2027/0123; G02B 2027/0174
  USPC ........................................................ 359/567
  See application file for complete search history.

(56) References Cited

U.S. PATENT DOCUMENTS

| | | | |
|---|---|---|---|
| 7,483,604 B2 | 1/2009 | Levola | |
| 7,583,439 B2 | 9/2009 | Tsai et al. | |
| 7,627,201 B2 | 12/2009 | Tiefenthaler | |
| 7,764,413 B2 | 7/2010 | Levola | |
| 8,160,411 B2 | 4/2012 | Levola et al. | |
| 8,508,848 B2 | 8/2013 | Saarikko | |
| 8,593,734 B2 | 11/2013 | Laakkonen | |
| 9,164,290 B2 | 10/2015 | Robbins et al. | |
| 2006/0126182 A1 | 6/2006 | Levola | |
| 2009/0244706 A1 | 10/2009 | Levola et al. | |
| 2009/0303599 A1 | 12/2009 | Levola | |
| 2010/0142571 A1 | 6/2010 | Park et al. | |
| 2010/0321781 A1 | 12/2010 | Levola et al. | |
| 2013/0314789 A1 | 11/2013 | Saarikko et al. | |

OTHER PUBLICATIONS

Siitonen, et al., "A double-sided grating coupler for thin light guides", In Journal of Optics Express, vol. 15, Issue 5, Mar. 5, 2007, 11 pages.

"International Search Report and Written Opinion Issued in PCT Application No. PCT/US2017/030005", dated Jul. 7, 2017, 13 pages.

DEGREES OF FREEDOM FOR DIFFRACTION ELEMENTS IN WAVE EXPANDER

BACKGROUND

Near-eye display (NED) devices such as head-mounted display (HMD) devices have been introduced into the consumer marketplace recently to support visualization technologies such as augmented reality (AR) and virtual reality (VR). A near-eye display device may include components such as one or more light sources, microdisplay modules, controlling electronics, and various optics such as waveguides, lenses, beam splitters, etc.

Waveguides may be used in a near-eye display device to convey light representing artificially-generated images from the image generation components of the device to an optical receptor of a user (e.g., a human eye). One or more of these waveguides may act as the device's image output interface to the user; these waveguides can be referred to as "output waveguides" of the device. For example, with a near-eye AR device, the user may see computer-generated images projected from a transparent output waveguide while the user views the real world through the output waveguide. In this way, the computer-generated images appear to be superimposed over the user's real-world environment.

Some waveguides in a near-eye display device may include diffraction optical elements in different regions that expand light wave signals in two dimensions. However, the choices of orientations and periods of the diffraction optical elements are limited in order to out-couple the expanded light wave signals in a desired direction.

SUMMARY

Introduced here are at least one apparatus and at least one method (collectively and individually, "the technique introduced here") providing additional degrees of freedom for diffraction gratings of an output waveguide in a near-eye display device. The output waveguide expands light waves and guides the light waves to an optical receptor of a user. The following description generally assumes that the "user" of the display device is a human, to facilitate description. Note, however, that a display device embodying the technique introduced here can potentially be used by a user that is not human, such as a machine or an animal. Hence, the term "user" herein can refer to any of those possibilities, except as may be otherwise stated or evident from the context. Similarly, the term "optical receptor" as used herein can refer to an eye of a human or animal or to an optical sensor of a machine.

In some embodiments, the near-eye display device includes an imager to generate an image based on light from a light source. The device further includes a waveguide to input a light wave representing the image received from the imager and to output the light wave representing the image toward an optical receptor of a user. The waveguide includes a plurality of diffractive optical elements (DOEs) in a common light path from an input of the waveguide to an output of the waveguide. The DOEs include a plurality of periodic diffraction patterns. Each of the periodic diffraction patterns is represented by a diffraction pattern vector. The periodic diffraction patterns are determined such that a vector summation of the diffraction pattern vectors equals zero.

In some embodiments, the near-eye display device includes an imager to generate an image based on light from a light source. The device in such embodiments further includes a waveguide to input a light wave representing the image received from the imager and to output the light wave representing the image toward an optical receptor of a user. The waveguide includes a plurality of periodic diffraction patterns. Each of the periodic diffraction patterns is represented by a grating vector (also referred to as diffraction pattern vector). The periodic diffraction patterns are determined such that a weighted vector summation of the diffraction pattern vectors equals zero, where the weights of the addends of the weighted vector summation are integer numbers.

In some embodiments, a method includes steps of generating an image by an imager based on light from a light source, receiving a light wave representing the image incident upon a first DOE of a waveguide in a first direction and redirecting the light wave to a second DOE of the waveguide by a first periodic diffraction pattern of the first DOE, expanding the light wave in a second direction by a second periodic diffraction pattern of the second DOE and redirecting the light wave to a third DOE of the waveguide, and further expanding the light wave in a third direction by a third periodic diffraction pattern of the third DOE and redirecting the light wave toward an optical receptor of a user in the first direction. The weighted vector summation of diffraction pattern vectors of the first, second and third periodic diffraction patterns equals zero. The weights of the addends of the weighted vector summation are integer numbers.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Some near-eye AR display devices include one or more output waveguides positioned in front of one or more optical receptors of a user (e.g., eyes of a person). The output waveguides can propagate and expand light waves provided by an imager and guide the light waves toward an optical receptor of a user of the near-eye AR display device using diffractive optical elements (DOEs). For example, the output waveguide can expand a light wave in a particular direction. Expanding in this context means that the light wave is split into multiple light waves (also referred to as "expanded light waves") via reflections and diffractions by the DOEs. The propagation directions of the expanded light waves are parallel to each other. The expanded light waves are spaced or distributed along the particular direction.

In other words, the expanded light waves are translated along the particular direction (or coordinate axis) in an output waveguide before exiting the output waveguide. Each of the expanded light waves has a relatively narrow range of propagation angles or field of view. Each expanded light wave has a "propagation vector" representing the average propagation direction of the light wave and denoting a center axis of the prorogation energy of the expanded light wave. Translation of a light wave means shifting the corresponding propagation vector of the light wave along a particular direction (or coordinate axis) that is not parallel to the propagation vector itself.

Thus, the light waves exiting the output waveguide have the same direction as (i.e., are parallel to) the light waves entering the output waveguide for light of any given wavelength, to have the light waves follow the desired path to the optical receptor of a user. This condition is called achromatic imaging.

To accomplish achromatic imaging in a near-eye display device, the choices of properties of the DOEs within the output waveguides are limited. The technology disclosed herein provides a way to satisfy the achromatic imaging condition without imposing undue limitation on the design choices of the DOEs. For example, the orientations and grating periods of the diffraction gratings of the DOEs can be determined such a vector summation of grating vectors of the diffraction gratings equals zero. This zero summation approach for the diffraction gratings causes the waveguide to satisfy the achromatic imaging condition, while the DOEs still retain degrees of freedom for the grating orientations and grating periods.

Figure 1:
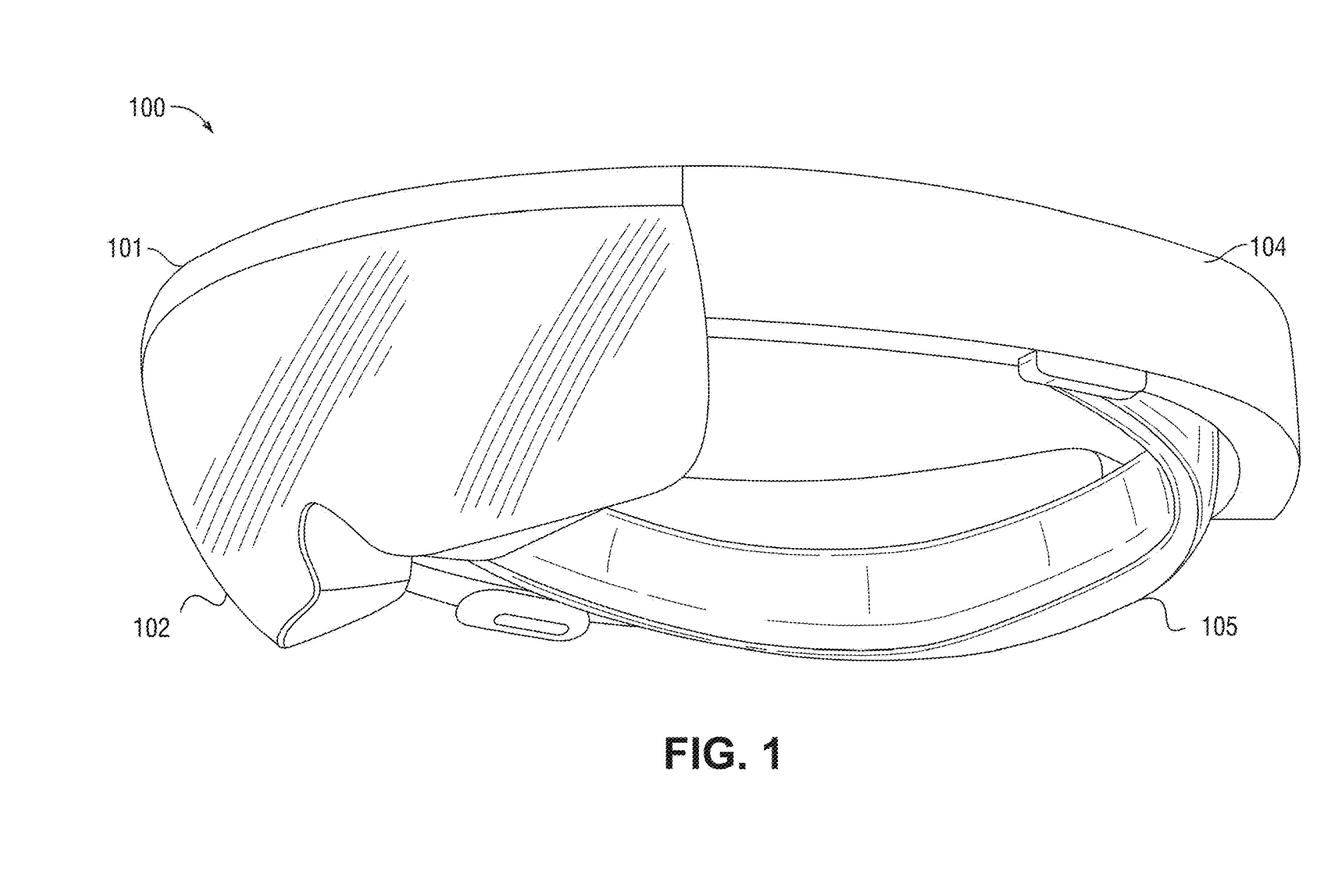
FIG. 1 shows an example of a near-eye display device that may incorporate the technique introduced herein.

FIG. 1 shows an example of a near-eye display device in which the technique introduced here can be incorporated. The near-eye display device 100 may provide virtual reality (VR) and/or augmented reality (AR) display modes for the user, i.e., the wearer of the device. To facilitate description, it is henceforth assumed that the near-eye display device 100 is designed for AR visualization.

In the illustrated embodiment, the near-eye display device 100 includes a chassis 101, a transparent protective visor 102 mounted to the chassis 101, and left and right side arms 104 mounted to the chassis 101. The visor 102 forms a protective enclosure for various display elements (not shown) that are discussed below.

The chassis 101 is the mounting structure for the visor 102 and side arms 104, as well as for various sensors and other components (not shown) that are not germane to this description. A display assembly (not shown) that can generate images for AR visualization is also mounted to the chassis 101 and enclosed within the protective visor 102. The visor assembly 102 and/or chassis 101 may also house electronics (not shown) to control the functionality of the display assembly and other functions of the near-eye display device 100. The near-eye display device 100 further includes an adjustable headband 105 attached to the chassis 101, by which the near-eye display device 100 can be worn on a user's head.

Figure 2:
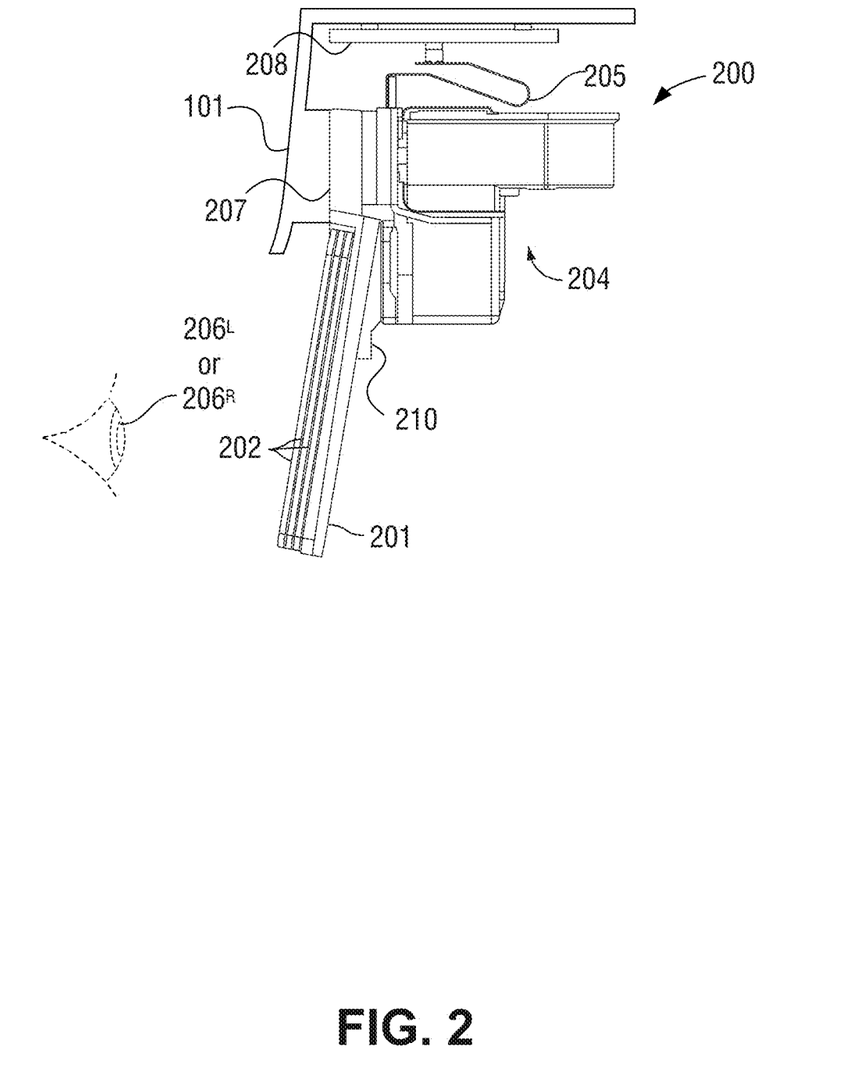
FIG. 2 shows a side view of display components that may be contained within the near-eye display device of FIG. 1.

FIG. 2 shows, in accordance with certain embodiments, a side view of display components that may be contained within the visor 102 of the near-eye display device 100. During operation of the near-eye display device 100, the display components are positioned relative to the user's left eye $206_L$ or right eye $206_R$. The display components are mounted to the interior surface of the chassis 101. The chassis 101 is shown in cross-section in FIG. 2.

The display components are designed to overlay three-dimensional images on the user's view of his real-world environment, e.g., by projecting light into the user's eyes. Accordingly, the display components include a display module 204 that houses a light engine including components such as: one or more light sources (e.g., one or more light emitting diodes (LEDs)); one or more microdisplay imagers, such as liquid crystal on silicon (LCOS), liquid crystal display (LCD), digital micromirror device (DMD); and one or more lenses, beam splitters and/or waveguides. The microdisplay imager(s) (not shown) within the display module 204 may be connected via a flexible circuit connector 205 to a printed circuit board 208 that has image generation/control electronics (not shown) mounted on it.

The display components further include a transparent waveguide carrier 201 to which the display module 204 is mounted, and multiple transparent output waveguides 202 stacked on the user's side of the waveguide carrier 201, for each of the left eye and right eye of the user. The waveguide carrier 201 has a central nose bridge portion 210, from which its left and right waveguide mounting surfaces extend. Multiple waveguides 202 are stacked on each of the left and right waveguide mounting surfaces of the waveguide carrier 201, to project light emitted from the display module and representing images into the left eye $206_L$ and right eye $206_R$, respectively, of the user. The display assembly 200 can be mounted to the chassis 101 through a center tab 207 located at the top of the waveguide carrier 201 over the central nose bridge section 210.

The near-eye display device can provide light representing an image to an optical receptor of a user. The user may be, e.g., a human, an animal or a machine.

Figure 3:
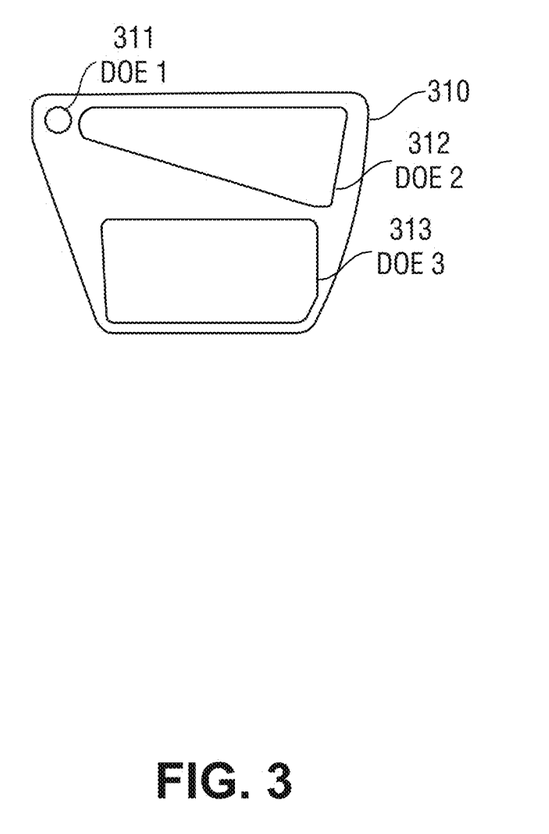
FIG. 3 shows an example of a waveguide to convey light to an eye of the user.

FIG. 3 shows an example of an output waveguide that can be mounted on the waveguide carrier 201 to convey light to an eye of the user. A similar waveguide can be designed for the left eye, for example, as a (horizontal) mirror image of the waveguide shown in FIG. 3. The waveguide 310 is transparent and, as can be seen from FIG. 2, would normally be disposed directly in front of the right eye of the user during operation of the near-eye display device, e.g., as one of the waveguides 202 in FIG. 2. The waveguide 310 is, therefore, shown from the user's perspective during operation of the near-eye display device 100. In some alternative embodiments, separate waveguides such as waveguide 310 can be disposed in front of each of the left eye and right eye of the user during operation of the near-eye display device.

The waveguide 310 includes a single input port 311 (also called in-coupling element) located in the region of the waveguide 310 that is closest to the user's nose bridge when the near-eye display device 100 is worn by the user. The input port 311 may be formed from, for example, a surface diffraction grating, volume diffraction grating, or a reflective component. The waveguide 310 further includes a single output port 313 (also called out-coupling element) and a transmission channel 312. A right-eye output port of the display module 204 (not shown) is optically coupled (but not necessarily physically coupled) to the input port 311 of the waveguide 310. During operation, the display module 204 (not shown) outputs light representing an image for the right eye from its right-eye output port into the input port 311 of the waveguide 310.

The transmission channel 312 conveys light from the input port 311 to the output port 313 and may be, for example, a surface diffraction grating, volume diffraction grating, or a reflective component. The transmission channel 312 may be designed to accomplish this by use of total internal reflection (TIR). Light representing the image for the right eye is then projected from the output port 313 to the user's eye.

The waveguide 310 may include multiple diffraction optical elements (DOEs), in order to control the directions of the light propagating in the near-eye display device via multiple occurrences of optical diffraction. The DOEs may be, for example, surface diffraction gratings or volume diffraction gratings. Various components of the waveguide 310 can be designed to contain one or more of the DOEs.

For example, the waveguide 310 may include three DOEs. The input port 311 of the waveguide 310 is a DOE 1 for coupling light into the waveguide 310 and controlling the direction of light path after the light reaches the input port 311. The transmission channel 312 of the waveguide 310 is a DOE 1 for controlling the direction of light path in the transmission channel 312 and ensuring the light propagating inside of the transmission channel 312 through total internal reflection (TIR). The output port 313 is a DOE 3 for controlling the direction of the light path after the light exits the output port 313.

Figure 4:
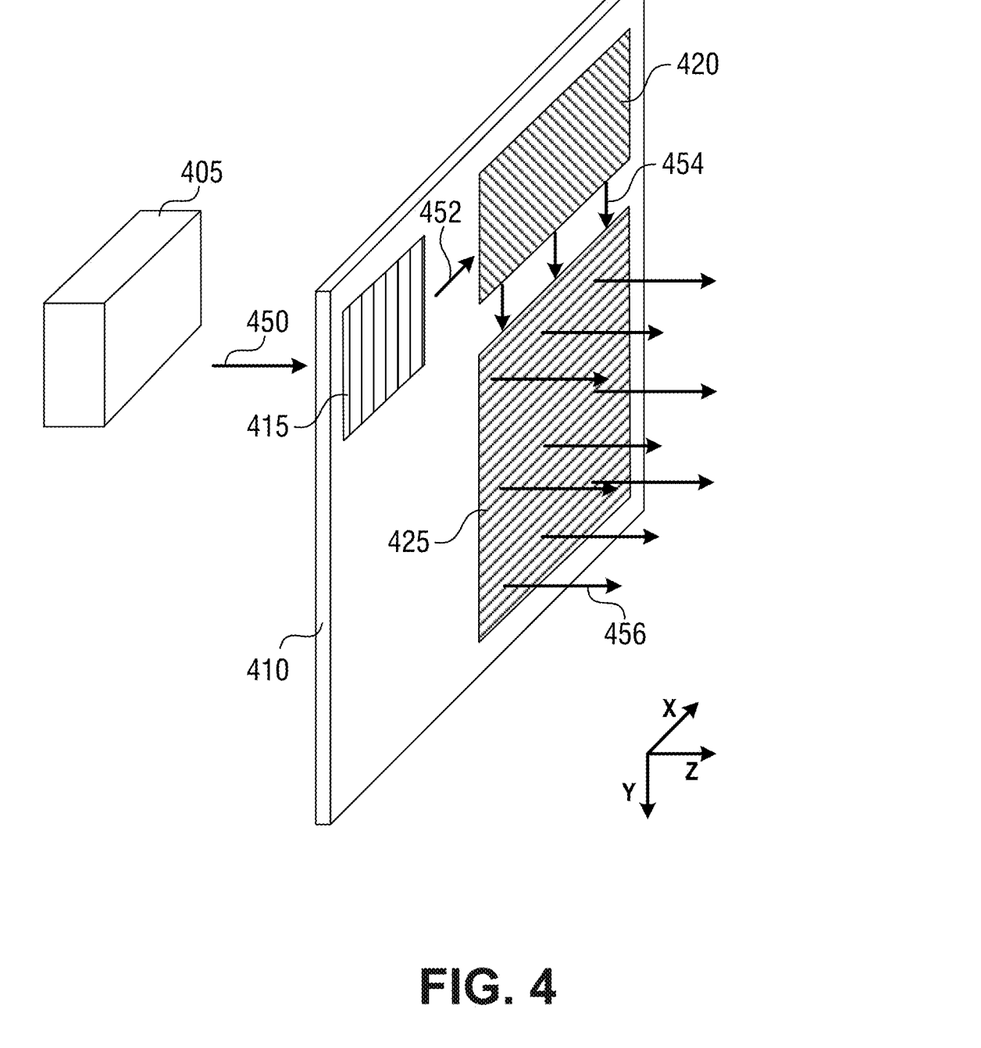
FIG. 4 shows an example of an output waveguide that expands an exit pupil of a near-eye display device.

The waveguide including three DOEs can expand the light waves in two dimensions. The expansion process is also referred to as exit pupil expansion. FIG. 4 shows an example of an output waveguide that expands the exit pupil of a near-eye display device. The waveguide 410 includes three DOEs 415, 420 and 425 to expand the exit pupil. The DOEs 415, 420 and 425 are successive in a common light path. The DOEs 415, 420 and 425 can be, e.g., arranged on a planar substrate.

The imager 405 (e.g., an LCOS device) outputs a light wave 450 that is incident upon the first DOE 415 in a Z direction. The DOE 415 directs the light wave 452 toward the second DOE 420. As shown in FIG. 4, the DOE 420 expands the light wave 454 in a first dimension (X dimension). As shown in FIG. 4, during the expansion, each propagation vector of the expanded light waves 454 is shifted along the X coordinate axis such that the expanded light waves are spaced or distributed in the X dimension.

The DOE 420 further redirects the expanded light wave 454 to a third DOE 425. The third DOE 425 further expands the light wave 454 in a second dimension (Y dimension), and redirects the expanded light wave 456 outward in the Z direction.

Thus, the waveguide 410 receives the input light wave 450 incident in the Z direction, expands the light wave in both X and Y dimensions, and redirects the expanded light waves in the same Z-direction. In other words, the waveguide 410 expanded light distribution in two dimensions while maintains the direction of the light wave. Thus, the waveguide 410 can be referred to as a beam-expanding device or an exit pupil expander.

Figure 5A:
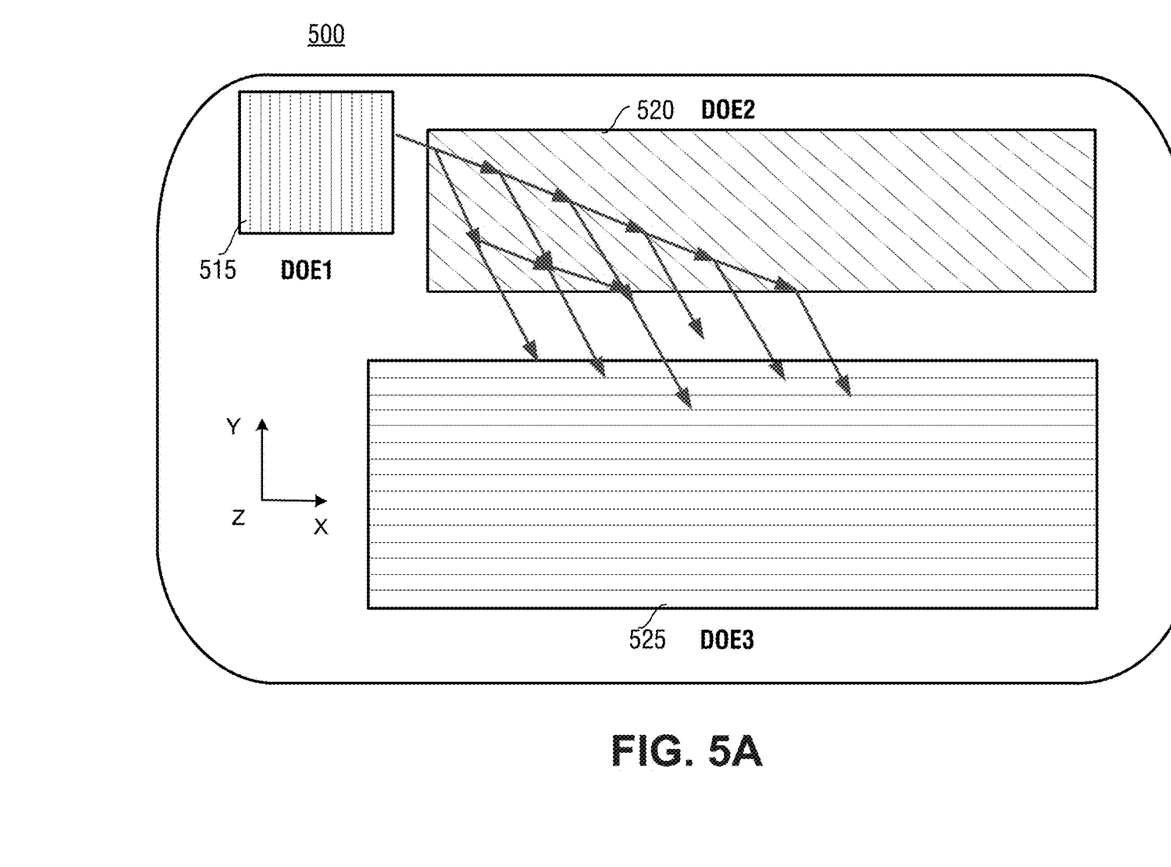
FIG. 5A shows an output waveguide conducting an odd-order expansion.

The waveguide, as a beam-expanding device, can expand light waves in, e.g., an odd-order expansion process or an even-order process. FIG. 5A shows an output waveguide conducting an odd-order expansion. The waveguide 500 includes DOEs 515, 520 and 525.

Each of the DOEs 515, 520 and 525 has a diffraction grating. A diffraction grating is an optical component with a periodic structure, which splits and diffracts an incident light beam into several beams travelling in different directions. The periodic structure can include linear grooves arranged in a periodic pattern. The distance between nearby grooves is called grating period d.

The diffraction grating has a property of grating vector D (also referred to as diffraction pattern vector). The grating vector D represents the direction and spacing of the grating pattern (also referred to as periodic diffraction pattern). The length of a grating vector is $D=2\pi/d$. The direction of the grating vector D is perpendicular to ("normal to" or "orthogonal to") center axes of the periodic linear grooves, where the center axes are perpendicular to the cross sections of the periodic linear grooves.

Light is incident upon the waveguide 500 in a Z direction, which is perpendicular to the X and Y directions. The first DOE 515 couples light from an imager (not shown) into the waveguide 500. The second DOE 520 expands the light in the X direction. The third DOE 525 further expands the light in the Y direction and couples the expanded light out from the waveguide 500 in the same Z direction.

As shown in FIG. 5A, the second DOE 520 receives the light wave from the first DOE 515 at a left edge (as the reader views the figure) of the DOE 520. The light wave is reflected by the grating pattern in the DOE 520 for one or more times before the light wave exits the DOE 520 at a bottom edge of the DOE 520. Because the odd-order expansion enables the second DOE 520 to receive the light wave at a side edge, a waveguide of an odd-order expansion configuration usually occupies less space than a waveguide of an even-order expansion configuration (which is discussed later).

During the odd-order expansion process, the second DOE 520 diffracts (e.g., changes the direction of) the light for an odd number of times before redirecting the light into the third DOE 525. Over the process of multiple diffractions between 0 and +1 diffraction orders, a greater portion of the light energy is converted to +1 order, which is redirected toward the third DOE 525.

Figure 5B:
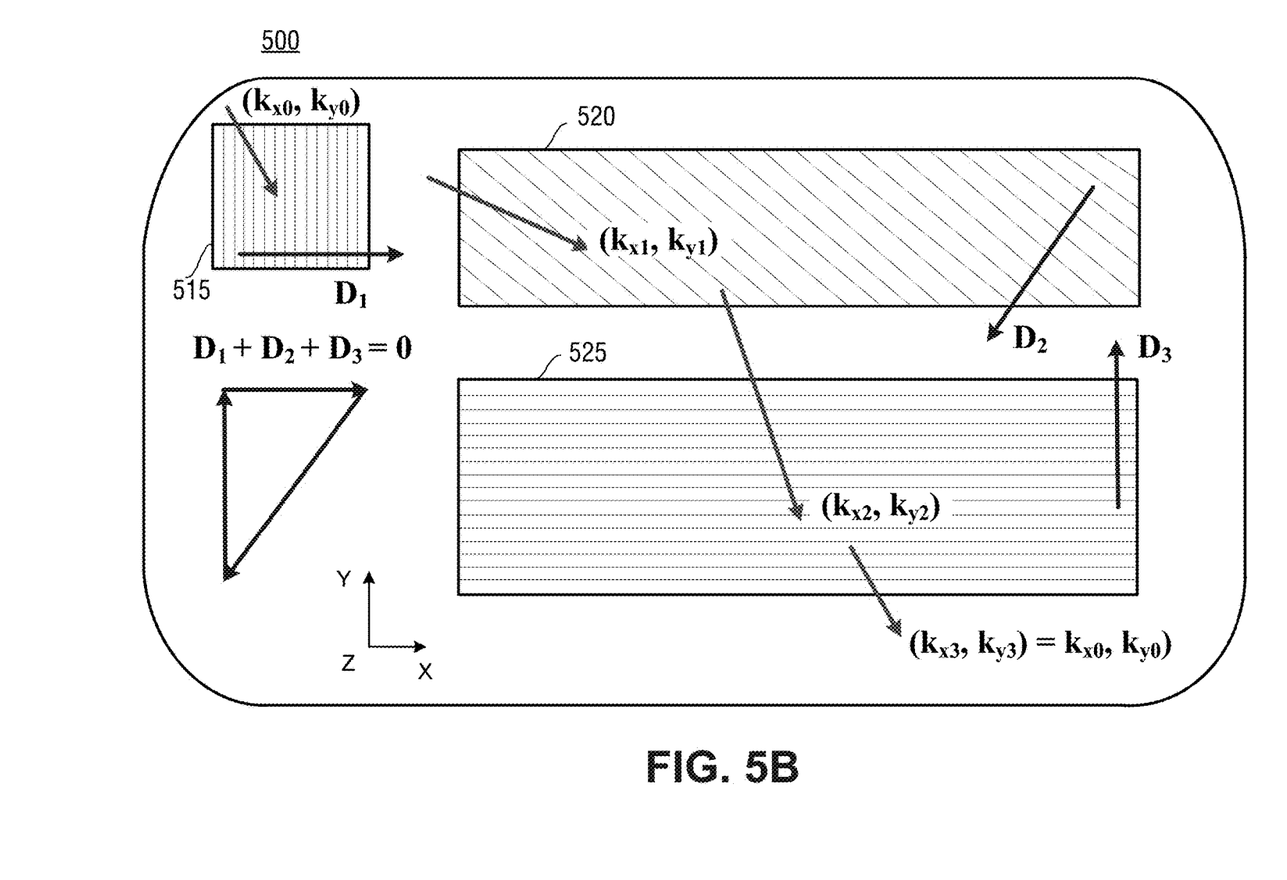
FIG. 5B shows wave vectors of light propagating in the output waveguide of FIG. 5A and grating vectors of DOEs of the output waveguide.

FIG. 5B shows the wave vectors of light propagating in the waveguide and grating vectors of DOEs of the waveguide. The incident light has a pair of transverse wave vector components $k_{x0}$ and $k_{y0}$. The magnitude of the wave vector is the wave number $k=2\pi/\lambda$, where $\lambda$ is the wavelength of the light. The wave number of the incident light in the air is denoted as $k_0$. The wave number of the light propagating in the waveguide is denoted as $k=k_0 \cdot n$, where n is the refractive index of the waveguide material.

The grating vectors of the DOE 1, 2, and 3 (515, 520 and 525 in FIG. 5B) are denoted as $D_j=(D_{xj}, D_{yj})$. The DOE 515 with a wave vector of $(D_{x1}, D_{y1})$ redirects the incident light $(k_{x0}, k_{y0})$ toward the second DOE 520. Therefore, $$(k_{x1}, k_{y1})=(k_{x0}+D_{x1}, k_{y0}+D_{y1}).$$

The DOE 520 with a wave vector of $(D_{x2}, D_{y2})$ receives light $(k_{x1}, k_{y1})$ and redirects the light $(k_{x1}, k_{y1})$ toward the third DOE 525. Therefore, $$(k_{x2}, k_{y2})=(k_{x1}+D_{x2}, k_{y1}+D_{y2})=(k_{x0}+D_{x1}+D_{x2}, k_{y0}+D_{y1}+D_{y2}).$$

The DOE 525 with a wave vector of $(D_{x3}, D_{y3})$ receives light $(k_{x2}, k_{y2})$ and couples the light $(k_2, k_{y2})$ out in a Z direction. Therefore, $$(k_{x3}, k_{y3})=(k_{x2}+D_{x3}, k_{y2}+D_{y3})=(k_{x0}+D_{x1}+D_{x2}+D_{x3}, k_{y0}+D_{y1}+D_{y2}+D_{y3}).$$

The waveguide 500 satisfies the achromatic imaging condition, which means that when the light waves with different wavelengths are expanded by the waveguide 500 and exit the waveguide 500, the exit directions of the light waves are the same as the input directions in which the light waves enter the waveguide 500. In other words, the incident light wave number $(k_{x0}, k_{y0})$ matches the out-coupled light wave number $(k_{x3}, k_{y3})$: $(k_{x0}, k_{y0})=(k_{x3}, k_{y3})$. Therefore, the grating vectors of the waveguide 500 satisfy $$D_{x1}+D_{x2}+D_{x3}=D_{y1}+D_{y2}+D_{y3})=0.$$

Alternatively, in a vector form, a vector summation of the grating vectors equals zero:

$$D_1+D_2+D_3=0$$

(also referred to as the "summation rule").

Note that the grating vectors $D_1$, $D_2$, $D_3$ depend on grating periods but do not depend on wavelengths of the light waves. Therefore, once the grating vectors satisfy the summation rule, the achromatic imaging condition is satisfied for light waves with any wavelengths (hence the term "achromatic imaging").

To satisfy the achromatic imaging condition, it is not necessary to restrict the diffraction gratings of first DOE 515 and the DOE 525 to have the same grating period. The summation rule relaxes the design limitations of those diffraction gratings. The relaxed design limitations enable a waveguide 500 to have a larger field of view (FOV).

Furthermore, the waveguide 500 keeps the light diffracted by DOEs 515 and 520 inside the waveguide 500. Thus, the light propagating inside of the waveguide 500 is not evanescent and satisfies condition of total internal reflection (TIR). In other words, light diffracted by DOE 515 satisfies the TIR condition inside of the waveguide: $k_{x1}^2+k_{y1}^2>k_0^2$. Light diffracted by DOE 515 is not evanescent: $k_{x1}^2+k_{y1}^2<k^2$. Light diffracted by DOE 520 also satisfies the TIR condition inside of the waveguide: $k_{x2}^2+k_{y2}^2>k_0^2$. Light diffracted by DOE 520 is not evanescent: $k_{x2}^2+k_{y2}^2<k^2$.

Figure 5C:
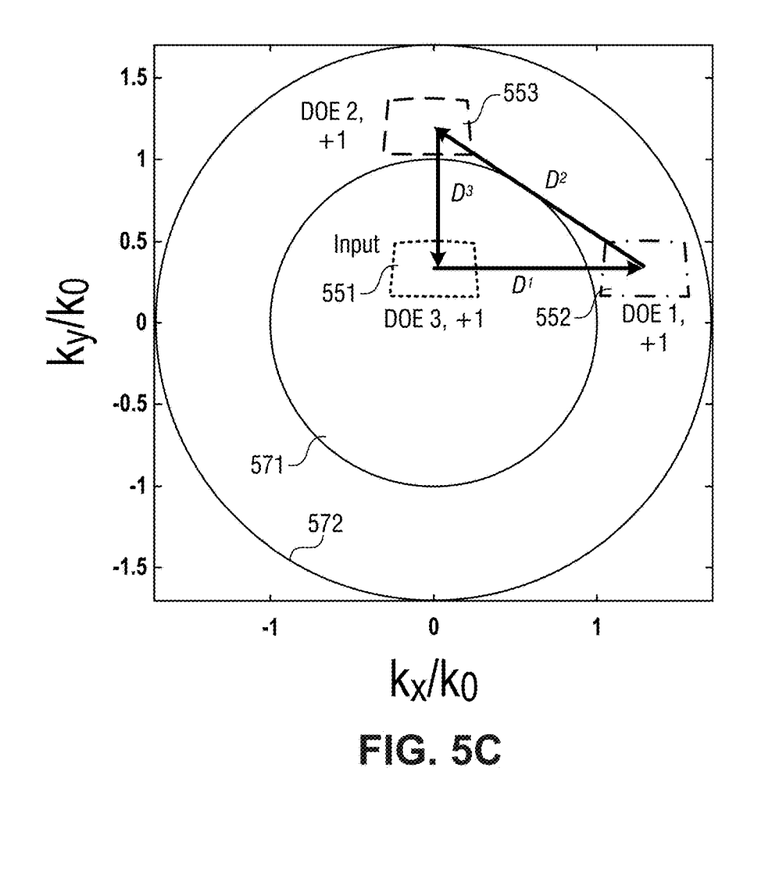
FIG. 5C shows a transverse wave vector space representation of light waves travelling through DOEs of the output waveguide of FIG. 5A.

The travelling directions of light waves in the DOEs of the waveguide can be explained by a wave vector space representation. FIG. 5C shows a transverse wave vector space representation of light waves travelling through DOEs of the waveguide. The inner solid circle 571 represents the border of TIR condition. The outer solid circle 572 represents the border of evanescent waves.

Therefore, any light waves in the doughnut shaped portion between concentric circles 571 and 572 propagate in the waveguide by total internal reflection (TIR). Any light waves in the inner circle 571 are waves that propagate in the waveguide and then exit into the air. In other words, those light waves propagate in the waveguide and then exit from the waveguide. Any light waves outside of the outer circle 572 are evanescent waves that are not coupled into the waveguide.

Areas 552, 554 and 556 represent the FOVs diffracted by DOEs of the waveguide. The FOV of the incident light is represented by area 551 ("FOV 551"). DOE 1 transforms the light into an FOV represented by area 552 ("FOV 552"). Then DOE 2 transforms the light into an FOV represented by area 553 ("FOV 553"). In DOE 2, light bounces back and forth between the area 552 and area 553 for odd number of times, before being redirected into DOE 3.

The DOE 3 transforms the light into an FOV represented by area 551. In other words, the FOV of the output light (FOV 551) matches the FOV of the input light (again, FOV 551). Thus, the waveguide satisfies the achromatic imaging condition. As shown in FIG. 5C, the grating vectors of DOEs 1, 2 and 3 satisfy $D_1+D_2+D_3=0$.

Although FIGS. 5A, 5B and 5C shows a waveguide including three DOEs, a waveguide according to the disclosed technology can have any arbitrary number of DOEs. For example, if a waveguide includes N number of DOEs, the condition of achromatic imaging is $$D_{x1}+D_{x2}+D_{x3}+\ldots+D_{xN}=D_{y1}+D_{y2}+D_{x3}+\ldots+D_{yN}=0.$$

Alternatively, in a vector form:

$$D_1+D_2+D_3+\ldots+D_N=0.$$

The DOEs also satisfy the conditions for TIR and non-evanescence.

In some embodiments, the achromatic imaging condition can be expressed as a weighted vector summation of the grating vectors:

$$mD_1+nD_2+lD_3=0,$$

where the values m, n, and l in the addends are integer weight values that represent diffraction orders to which the periodic diffraction patterns are designed to concentrate light energy. In some embodiments, the integer weight values can be 0, negative, or positive.

Figure 6:
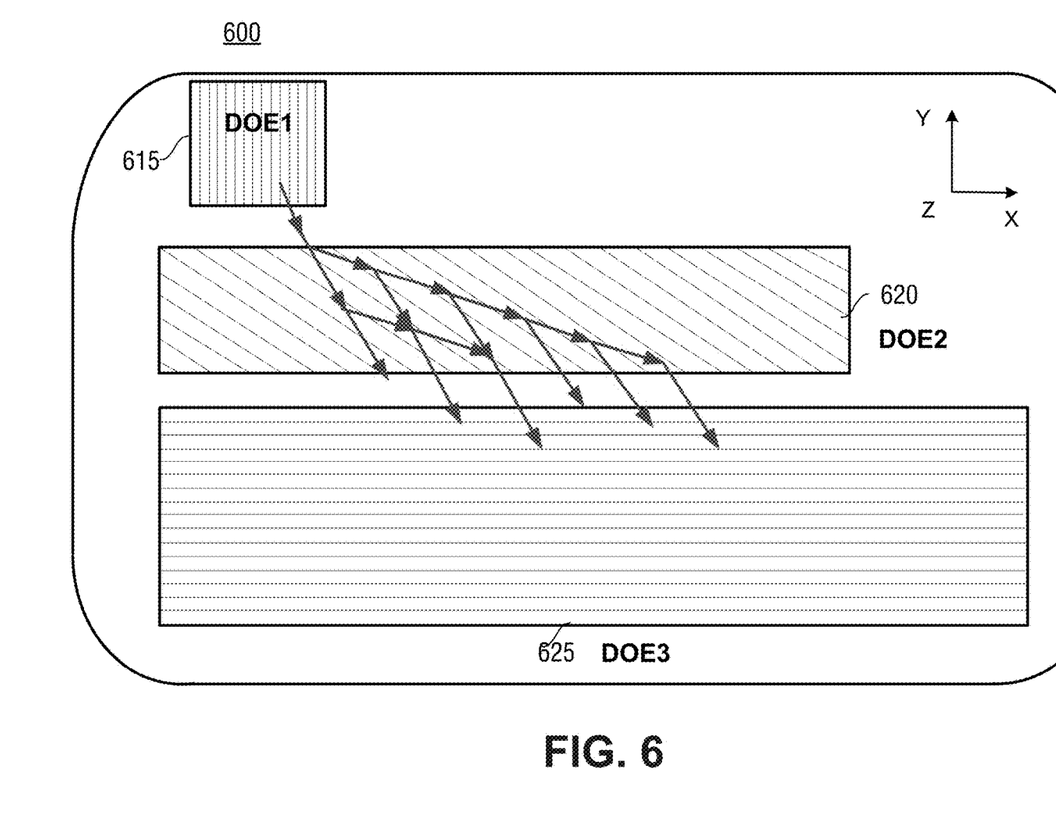
FIG. 6 shows an output waveguide conducting an even-order expansion.

Furthermore, the waveguide, as a beam-expanding device, can expand light waves in an even-order expansion process as well. FIG. 6 shows an output waveguide conducting an even-order expansion. The waveguide 600 includes DOEs 615, 620 and 625.

Light is incident upon the waveguide 600 in a Z direction, which is perpendicular to the X and Y directions. The first DOE 615 couples light into the waveguide 600, and redirects the light wave into the second DOE 620 at a top edge of DOE 620. The second DOE 620 expands the light in the X direction. The third DOE 625 further expands the light in the Y direction and couples the expanded light out from the waveguide 600 in the same Z direction.

As shown in FIG. 6, the second DOE 620 receives the light wave from the first DOE 615 at the top edge of the DOE 520. Note that in the odd-order expansion illustrated in FIG. 5A, the second DOE 520 receives the light wave at the left side edge. The choice of either odd-order expansion or even-order expansion depends on various design factors for the waveguide. Typically, a waveguide of odd-order expansion configuration tends to be smaller. An even-order expansion configuration, on the other hand, enables supplying the light wave at the top edge of the second DOE, which may be advantageous when there is a limitation on the width of the waveguide.

The light wave is reflected by the grating pattern in the DOE 620 multiple times before the light wave exits the DOE 620 at a bottom edge of the DOE 620. During the even-order expansion process, the second DOE 620 diffracts the light an even number of times (including zero time) before redirecting the light into the third DOE 625. Similar to the odd-order expansion, over the process of multiple diffractions between 0 and +1 orders, more of the light energy is converted to +1 order, which is redirected toward the third DOE 625.

As shown in FIG. 6, the second DOE 620 expands the light wave in the X direction. However, the second DOE 620 maintains the direction of its output light as the same of the direction of its input light. In other words, in the even-order expansion, the wave vectors of light waves before and after second DOE 620 are identical. Thus, the grating vector for the diffraction grating of the second DOE 620 does not impose limitation to diffraction vectors of other DOEs in the waveguide 600.

In the even-order expansion, the first DOE 615 can have, e.g., linear diffraction gratings on two sides of the DOE 615 (also referred to as "dual-sided linear grating"). The first diffraction grating on a first side (e.g., top side) of DOE 615 has a grating vector of $D_{1a}=(D_{x1a}, D_{y1a})$. The second diffraction grating on a second side (e.g., bottom side) of DOE 615 has a grating vector of $D_{1b}=(D_{x1b}, D_{y1b})$. The diffraction grating of the third DOE 625 has a grating vector of $D_3=(D_{x3}, D_{y3})$ The waveguide 600 satisfies the achromatic imaging condition, which means the incident light $(k_{x0}, k_{y0})$ matches the out-coupled light $(k_{x3}, k_{y3})$. The achromatic imaging condition is satisfied, if $$mD_{1a}+nD_{1b}=\pm D_3,$$

wherein m and n are integer order numbers.

In some embodiments, the achromatic imaging condition can be expressed as a weighted vector summation of the grating vectors:

$$mD_{1a}+nD_{1b}+lD_3=0,$$

where the values m, n and l in the addends are integer weight values that represent diffraction orders to which the periodic diffraction patterns are designed to concentrate light energy (also referred to as "weighted summation rule"). In some embodiments, the integer weight values can be 0, −1 or +1. Higher diffraction orders, corresponding to integer numbers whose absolute values are larger than 1, are usually suppressed by the grating patterns.

In some embodiments, m=1 and n=0, or m=0 and n=1. Thus, the first DOE 615 has one diffraction grating with a wave vector $D_1=\pm D_3$. In other words, if the first DOE 615 and the third DOE 625 have the same length for the grating vectors (or the same grating period), the achromatic imaging condition is satisfied.

The design limitation of the grating vectors can be further relaxed, because the grating periods for first DOE 615 and third DOE 625 do not need to be equal. In some embodiments, m=1 and n=1, which means the first diffraction grating of the first DOE 615 reflects the light wave to +1 diffraction order, and then the second diffraction grating of the first DOE 615 reflects the light wave again to +1 diffraction order. Diffraction orders higher than the +1 diffraction order usually are less efficient and can create ghost image effects. Thus, when m=1 and n=1, a vector sum of the grating vectors of the diffraction gratings of the first DOE 615 either equals the grating vector of the third DOE 625, or is the exact opposite to the grating vector of the third DOE 625:

$$D_{1a}+D_{1b}=\pm D_3.$$

Particularly, in case of $-D_3$, the first and second diffraction gratings of the first DOE 615 and the diffraction grating of the third DOE 625 satisfy the summation rule:

$$D_{1a}+D_{1b}+D_3=0.$$

Besides dual-sided linear grating, the first DOE 615 can have, e.g., crossed diffraction gratings on two sides of the DOE 615 (also referred to as "dual-sided crossed grating"). Thus, the first DOE 615 effectively have four diffraction gratings with four grating vectors. On a first side (e.g., top side) of the first DOE 615, there are two diffraction gratings that are crossed to each other and have grating vectors of $D_{1a}=(D_{x1a}, D_{y1a})$ and $D_{1b}=(D_{x1b}, D_{y1b})$. In other words, the grating pattern is periodic in two directions on the first side. On a second side (e.g., bottom side) of the first DOE 615, there are two diffraction gratings that are crossed to each other and have grating vectors of $D_{1c}=(D_{x1c}, D_{y1c})$ and $D_{1d}=(D_{x1d}, D_{y1d})$.

The waveguide 600 satisfies the achromatic imaging condition, which means the incident light matches the out-coupled light. The achromatic imaging condition is satisfied, if $$mD_{1a}+nD_{1b}+oD_{1c}+pD_{1d}=\pm D_3,$$

wherein m, n, o, and p are integer order numbers.

Therefore, the weighted vector summation rule can be used to design DOEs of output waveguides. The diffraction gratings of DOEs follow the summation rule or the weighted summation rule, and therefore satisfies the achromatic imaging order. The summation rule or the weighted summation rule enables relaxed degrees of freedom for designing the configuration of the output waveguides with various properties of DOEs.

EXAMPLES OF CERTAIN EMBODIMENTS

Certain embodiments of the technology introduced herein are summarized in the following numbered examples:

1. A near-eye display device including: an imager to generate an image based on light from a light source; and a waveguide to input a light wave representing the image received from the imager and to output the light wave representing the image toward an optical receptor of a user of the near-eye display device, the waveguide including a plurality of diffractive optical elements (DOEs) in a common light path from an input of the waveguide to an output of the waveguide, the DOEs including a plurality of periodic diffraction patterns, each of the periodic diffraction patterns being represented by a corresponding diffraction pattern vector, the periodic diffraction patterns being such that a vector summation of the diffraction pattern vectors of the plurality of DOEs equals zero.

2. The near-eye display device of example 1, wherein the waveguide receives the light wave in a first direction, and the plurality of DOEs of the waveguide collectively expand the light wave in a second direction and a third direction and output the light wave in the first direction.

3. The near-eye display device of example 1 or 2, wherein the plurality of DOEs include: a first DOE to receive the light wave incident upon the first DOE in a first direction and redirect the light wave; a second DOE to receive the light wave from the first DOE and expand the light wave in a second direction; and a third DOE to further expand the light wave in a third direction and redirect the expanded light wave toward the optical receptor of the user in the first direction.

4. The near-eye display device in any of the preceding examples 1 through 3, wherein the light wave propagates in the common light path within the waveguide from a first DOE to a second DOE and then to a third DOE, wherein each of the first, second, and third DOE includes a periodic diffraction pattern, and wherein the vector summation of the diffraction pattern vectors of the periodic diffraction patterns of the first, second, and third DOEs equals zero.

5. The near-eye display device of example 4, wherein while the light wave propagates in the second DOE and is expanded by the periodic diffraction pattern of the second DOE, the light wave is diffracted by the periodic diffraction pattern of the second DOE for an odd integer number of times.

6. The near-eye display device of example 5, wherein the first DOE redirects the light wave toward a side edge of the second DOE, and the second DOE redirects the light wave toward the third DOE through a bottom edge of the second DOE.

7. The near-eye display device in any of the preceding examples 4 through 6, wherein the light wave propagating in the first and second DOEs satisfies the total internal reflection condition: $kx2+ky2>k02$, where k0 is a wave number of the light wave before entering the waveguide, kx and ky are components of a wave number of the light wave propagating in the first or second DOEs.

8. The near-eye display device in any of the preceding examples 4 through 7, wherein the light wave propagating in the first and second DOEs satisfies the non-evanescence condition: $kx12+ky12<k2$, where k is a wave number of the light wave propagating within the waveguide, kx and ky are components of a wave number of the light wave propagating in the first or second DOEs.

9. The near-eye display device in any of the preceding examples 1 through 8, wherein the plurality of DOEs include: a first DOE to receive the light wave incident upon the first DOE in a first direction and redirect the light wave; a second DOE to receive the light wave from the first DOE and expand the light wave in a second direction, the light wave being reflected by a periodic diffraction pattern of the second DOE for an even integer number of times; and a third DOE to further expand the light wave in a third direction and redirect the expanded light wave toward the optical receptor of the user in the first direction.

10. The near-eye display device of example 9, wherein the second DOE expands the light wave and translates the expanded light wave in the second direction, and wherein the light wave exiting from the second DOE has the same direction as the light wave entering the second DOE.

11. The near-eye display device of example 9 or 10, wherein the first DOE redirects the light wave toward a top edge of the second DOE, and the second DOE redirects the light wave toward the third DOE through a bottom edge of the second DOE, the bottom edge being opposite to the top edge.

12. The near-eye display device in any of the preceding examples 9 through 11, wherein the first DOE includes a first and a second periodic diffraction patterns respectively on two edges of the first DOE, and the third DOE has a third periodic diffraction pattern, and a vector summation of diffraction pattern vectors of the first, second and third periodic diffraction patterns equals zero.

13. The near-eye display device in any of the preceding examples 9 through 12, wherein the first DOE includes a first and a second periodic diffraction patterns crossed to each other on a first edge of the first DOE, the first DOE further includes a third and a fourth period diffraction patterns crossed to each other on a second edge of the first DOE, and the third DOE has a fifth periodic diffraction pattern, and a vector summation of diffraction pattern vectors of the first, second, third, fourth and fifth periodic diffraction patterns equals zero.

14. A near-eye display device including: an imager to generate an image based on light from a light source; and a waveguide to expand a light wave representing the image into a plurality of expanded light waves exiting the waveguide in a common direction toward an optical receptor of a user of the near-eye display device, the waveguide including a plurality of periodic diffraction patterns, each of the periodic diffraction patterns being represented by a diffraction pattern vector, the periodic diffraction patterns being determined such that a weighted vector summation of the diffraction pattern vectors equals zero, wherein the weighted vector summation includes a plurality of addends, and wherein weights of the individual addends in the weighted vector summation are integer numbers.

15. The near-eye display device of example 14, wherein the integer numbers of weights represent diffraction orders to which the periodic diffraction patterns are designed to concentrate light energy.

16. The near-eye display device of example 14 or 15, wherein the integer numbers of weights are 0, −1 and +1, wherein integer numbers whose absolute values are larger than 1 represent higher diffraction orders that are suppressed by the periodic diffraction patterns.

17. The near-eye display device in any of the preceding examples 14 through 16, wherein the waveguide includes a plurality of diffractive optical elements (DOEs) in a common light path from an input of the waveguide to an output of the waveguide, each of the periodic diffraction patterns being on or within one of the DOEs; and wherein when the light wave propagates in a middle DOE in the middle of the common light path, the light wave is reflected an odd number of times by a periodic diffraction pattern of the middle DOE.

18. The near-eye display device in any of the preceding examples 14 through 17, wherein the waveguide includes a plurality of diffractive optical elements (DOEs) in a common light path from an input of the waveguide to an output of the waveguide, each of the periodic diffraction patterns being on or within one of the DOEs; and wherein when the light wave propagates in a middle DOE in the middle of the common light path, the light wave is reflected an even number of times by a periodic diffraction pattern of the middle DOE and wherein a first DOE in the common light path includes two periodic diffraction patterns on each of two surfaces of the first DOE.

19. The near-eye display device in any of the preceding examples 14 through 18, wherein the waveguide includes a plurality of diffractive optical elements (DOEs) in a common light path from an input of the waveguide to an output of the waveguide, each of the periodic diffraction patterns being on or within one of the DOEs; and wherein when the light wave propagates in a middle DOE in the middle of the common light path, the light wave is reflected for an even number of times by a periodic diffraction pattern of the middle DOE; and wherein a first DOE in the common light path includes two periodic diffraction patterns being crossed to each other on a surface of the first DOE.

20. An apparatus including: means for generating an image by an imager based on light from a light source; means for receiving a light wave representing the image incident upon a first diffractive optical element (DOE) of a waveguide in a first direction and redirecting the light wave to a second DOE of the waveguide by a first periodic diffraction pattern of the first DOE; means for expanding the light wave in a second direction by a second periodic diffraction pattern of the second DOE and redirecting the light wave to a third DOE of the waveguide; and means for expanding the light wave in a third direction by a third periodic diffraction pattern of the third DOE and redirecting the light wave toward an optical receptor of a user in the first direction; wherein a weighted vector summation of diffraction pattern vectors of the first, second and third periodic diffraction patterns equals zero, wherein the weighted vector summation includes a plurality of addends, and wherein weights of the individual addends in the weighted vector summation are integer numbers.

21. The apparatus of example 20, wherein the integer numbers of weights represent diffraction orders to which the first, second and third periodic diffraction patterns are designed to concentrate light energy.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A near-eye display device comprising:
   an imager to generate an image based on light from a light source; and
   a waveguide to input a light wave representing the image received from the imager and to output the light wave representing the image toward an optical receptor of a user of the near-eye display device, the waveguide including a plurality of diffractive optical elements (DOEs) in a common light path from an input of the waveguide to an output of the waveguide, the DOEs including a plurality of periodic diffraction patterns, each of the periodic diffraction patterns being represented by a corresponding diffraction pattern vector, the periodic diffraction patterns being such that a vector summation of the diffraction pattern vectors of the plurality of DOEs equals zero,
   wherein the plurality of DOEs include:
      a first DOE to receive the light wave incident upon the first DOE in a first direction and redirect the light wave;
      a second DOE to receive the light wave from the first DOE and expand the light wave in a second direction, the light wave being reflected by a periodic diffraction pattern of the second DOE for an even integer number of times; and
      a third DOE to further expand the light wave in a third direction and redirect the expanded light wave toward the optical receptor of the user in the first direction.

2. The near-eye display device of claim 1, wherein the waveguide receives the light wave in a first direction, and the plurality of DOEs of the waveguide collectively expand the light wave in the second direction and the third direction and output the light wave in the first direction.

3. The near-eye display device of claim 1, wherein the light wave propagates in the common light path within the waveguide from the first DOE to the second DOE and then to the third DOE, wherein each of the first, second, and third DOE includes a periodic diffraction pattern, and wherein the vector summation of the diffraction pattern vectors of the periodic diffraction patterns of the first, second, and third DOEs equals zero.

4. The near-eye display device of claim 3, wherein the light wave propagating in the first and second DOEs satisfies the total internal reflection condition: $k_x^2+k_y^2>k_o^2$, where $k_o$ is a wave number of the light wave before entering the waveguide, $k_x$ and $k_y$ are components of a wave number of the light wave propagating in the first or second DOEs.

5. The near-eye display device of claim 3, wherein the light wave propagating in the first and second DOEs satisfies the non-evanescence condition: $k_{x1}^2+k_{y1}^2<k^2$, where k is a wave number of the light wave propagating within the waveguide, $k_x$ and $k_y$ are components of a wave number of the light wave propagating in the first or second DOEs.

6. The near-eye display device of claim 1, wherein the second DOE expands the light wave and translates the expanded light wave in the second direction, and wherein the light wave exiting from the second DOE has the same direction as the light wave entering the second DOE.

7. The near-eye display device of claim 1, wherein the first DOE redirects the light wave toward a top edge of the second DOE, and the second DOE redirects the light wave toward the third DOE through a bottom edge of the second DOE, the bottom edge being opposite to the top edge.

8. The near-eye display device of claim 1, wherein the first DOE includes a first and a second periodic diffraction patterns respectively on two edges of the first DOE, and the third DOE has a third periodic diffraction pattern, and a vector summation of diffraction pattern vectors of the first, second and third periodic diffraction patterns equals zero.

9. The near-eye display device of claim 1, wherein the first DOE includes a first and a second periodic diffraction patterns crossed to each other on a first edge of the first DOE, the first DOE further includes a third and a fourth period diffraction patterns crossed to each other on a second edge of the first DOE, and the third DOE has a fifth periodic diffraction pattern, and a vector summation of diffraction pattern vectors of the first, second, third, fourth and fifth periodic diffraction patterns equals zero.

10. A near-eye display device comprising:
   an imager to generate an image based on light from a light source; and
   a waveguide to expand a light wave representing the image into a plurality of expanded light waves exiting the waveguide in a common direction toward an optical receptor of a user of the near-eye display device, the waveguide including a plurality of periodic diffraction patterns, each of the periodic diffraction patterns being represented by a diffraction pattern vector, the periodic diffraction patterns being determined such that a weighted vector summation of the diffraction pattern vectors equals zero, wherein the weighted vector summation includes a plurality of addends, and wherein weights of the individual addends in the weighted vector summation are integer numbers;
   wherein the waveguide includes a plurality of diffractive optical elements (DOEs) in a common light path from an input of the waveguide to an output of the waveguide, each of the periodic diffraction patterns being on or within one of the DOEs; and
   wherein when the light wave propagates in a middle DOE in the middle of the common light path, the light wave is reflected an even number of times by a periodic diffraction pattern of the middle DOE and wherein a first DOE in the common light path includes two periodic diffraction patterns on each of two surfaces of the first DOE.

11. The near-eye display device of claim 10, wherein the integer numbers of weights represent diffraction orders to which the periodic diffraction patterns are designed to concentrate light energy.

12. The near-eye display device of claim 10, wherein the integer numbers of weights are 0, −1 and +1, wherein integer numbers whose absolute values are larger than 1 represent higher diffraction orders that are suppressed by the periodic diffraction patterns.

13. The near-eye display device of claim 10, wherein the first DOE in the common light path includes two periodic diffraction patterns being crossed to each other on a surface of the first DOE.

14. A method comprising:
    generating an image by an imager based on light from a light source;
    receiving a light wave representing the image incident upon a first diffractive optical element (DOE) of a waveguide in a first direction and redirecting the light wave to a second DOE of the waveguide by a first periodic diffraction pattern of the first DOE;
    expanding the light wave in a second direction by a second periodic diffraction pattern of the second DOE and redirecting the light wave to a third DOE of the waveguide; and
    further expanding the light wave in a third direction by a third periodic diffraction pattern of the third DOE and redirecting the light wave toward an optical receptor of a user in the first direction;
    wherein a weighted vector summation of diffraction pattern vectors of the first, second and third periodic diffraction patterns equals zero, wherein the weighted vector summation includes a plurality of addends, and wherein weights of the individual addends in the weighted vector summation are integer numbers; and
    wherein when the light wave propagates in the second DOE in the middle of the common light path, the light wave is reflected an even number of times by a periodic diffraction pattern of the second DOE and wherein the first DOE in the common light path includes two periodic diffraction patterns on each of two surfaces of the first DOE.

* * * * *